US012385458B2

(12) United States Patent
Cheng

(10) Patent No.: US 12,385,458 B2
(45) Date of Patent: Aug. 12, 2025

(54) HIGH-VOLTAGE IGNITION DEVICE FOR AUTOMOBILES THAT CAN AVOID GENERATING HIGH TEMPERATURES

(71) Applicant: Xuehua Cheng, Hebei (CN)

(72) Inventor: Xuehua Cheng, Hebei (CN)

( * ) Notice: Subject to any disclaimer, the term of this patent is extended or adjusted under 35 U.S.C. 154(b) by 109 days.

(21) Appl. No.: 18/392,456

(22) Filed: Dec. 21, 2023

(65) Prior Publication Data

US 2024/0401553 A1 Dec. 5, 2024

(30) Foreign Application Priority Data

May 29, 2023 (CN) ......................... 202310616207.0
May 29, 2023 (CN) ......................... 202321326229.5
Sep. 12, 2023 (CN) ......................... 202322473211.4

(51) Int. Cl.
*F02P 7/03* (2006.01)
*F02P 3/08* (2006.01)

(52) U.S. Cl.
CPC ............. *F02P 7/035* (2013.01); *F02P 3/0807* (2013.01)

(58) Field of Classification Search
CPC ........... F02P 7/035; F02P 3/0807; F02P 11/00
USPC ......................................................... 123/596
See application file for complete search history.

(56) References Cited

U.S. PATENT DOCUMENTS

2013/0093342 A1* 4/2013 Tanaya ................. F02P 3/0807
315/209 CD

* cited by examiner

*Primary Examiner* — Yi-Kai Wang

(57) ABSTRACT

Disclosed is a high-voltage ignition device for automobiles that can avoid generating high temperatures, comprising a generator, a charger electrically connected to the generator, a lithium battery pack electrically connected to the charger, an ignition switch electrically connected to the lithium battery pack, an ignition coil electrically connected to the ignition switch, a distributor electrically connected to the ignition coil, a high-voltage package electrically connected to the distributor, and spark plugs electrically connected to the high-voltage package; the voltage of the lithium battery pack is higher than the voltage of the generator, and a control switching device is provided between the ignition coil and the distributor. The invention can achieve long-term constant high-voltage ignition, making the fuel burn more fully, the power is more powerful, and the fuel consumption is reduced at the same time, and the economy is better.

4 Claims, 2 Drawing Sheets

HIGH-VOLTAGE IGNITION DEVICE FOR AUTOMOBILES THAT CAN AVOID GENERATING HIGH TEMPERATURES

1. TECHNICAL FIELD

The invention relates to the technical field of vehicle equipment, and specifically refers to a high-voltage ignition device for automobiles that can avoid generating high temperatures.

2. BACKGROUND ART

The automobile ignition system is an ignition-type engine. In order to work normally, according to the ignition sequence of each cylinder, spark plugs are regularly supplied with high-energy high-voltage electricity (approximately 15,000 to 30,000V), so that the spark plugs generate a strong enough spark to ignite the combustible mixture. At present, the automobile ignition system consists of power supply, ignition coil, distributor, spark plugs, ignition switch and control circuit. The power supply generally consists of a battery and a generator, which mainly provides the required electrical energy for the ignition system. At present, the voltage of the battery pack is the same as the output voltage of the generator, but the battery will age and decay during operation; after a long time, it cannot provide the rated voltage required for ignition, resulting in insufficient fuel combustion and a waste of resources, and at the same time, the car's power becomes weaker. In addition, due to the high temperature in summer, when constant voltage ignition is used, the generator battery voltage is 14.1V, and when the generator battery is 13.9V, the temperature of the water in the water tank is high during traffic jams, and work abnormalities are prone to occur.

3. SUMMARY OF THE INVENTION

The technical problem to be solved by the invention is to overcome the defects of the above technology and provide a high-voltage ignition device for automobiles that can avoid generating high temperatures.

In order to solve the above technical problems, than technical solutions provided by the invention are: a high-voltage ignition device for automobiles that can avoid generating high temperatures, comprising a generator, a charger electrically connected to the generator, a lithium battery pack electrically connected to the charger, an ignition switch electrically connected to the lithium battery pack, an ignition coil electrically connected to the ignition switch, a distributor electrically connected to the ignition coil, a high-voltage package electrically connected to the distributor, and spark plugs electrically connected to the high-voltage package; the spark plugs are provided with multiple;

- the voltage of the lithium battery pack is higher than the voltage of the generator, and a control switching device is provided between the ignition coil and the distributor.

Further, the control switching device comprises a voltage limiting resistor, a parallel electric control switch, and a signal identification transmitter; the signal identification transmitter is electrically connected to a temperature sensor, and the signal identification transmitter is electrically connected to the parallel electric control switch; the voltage limiting resistor is connected in series between the ignition coil and the distributor; the distributor is electrically connected to the high-voltage package, and the high-voltage package is electrically connected to the spark plugs; the parallel electric control switch is connected in parallel with the voltage limiting resistor.

Further, the control switching device comprises a voltage limiting resistor and a parallel manual control switch; the voltage limiting resistor is connected in series between the ignition coil and the distributor; the distributor is electrically connected to the high-voltage package, and the high-voltage package is electrically connected to the spark plugs; the parallel manual control switch is connected in parallel with the voltage limiting resistor.

Further, the lithium battery pack is provided in a battery box; a buffer pad is filled between the lithium battery pack and the inner wall of the battery box, and the outside of the lithium battery pack is wrapped with a PE film;

- a fuse is provided on the circuit between the ignition switch and the ignition coil.

The advantages of the invention compared with the prior art are: the invention adopts the form that the battery voltage is slightly higher than the generator output voltage. When loading the vehicle, the battery is first discharged to make the voltage consistent with the generator output voltage before use. The discharge method adopts the method of turning on the headlights; this design can delay battery aging and decay, thereby achieving long-term constant high-voltage ignition, making the fuel burn more fully, the power is more powerful, and the fuel consumption is reduced at the same time, and the economy is better. By providing a control switching device, the current can only flow through the voltage-limiting resistor when it is disconnected to achieve control, thereby reducing the ignition voltage and preventing the water temperature from being too high by reducing the voltage, so as to ensure normal operation.

4. BRIEF DESCRIPTION OF ACCOMPANY DRAWINGS

Figure 1:
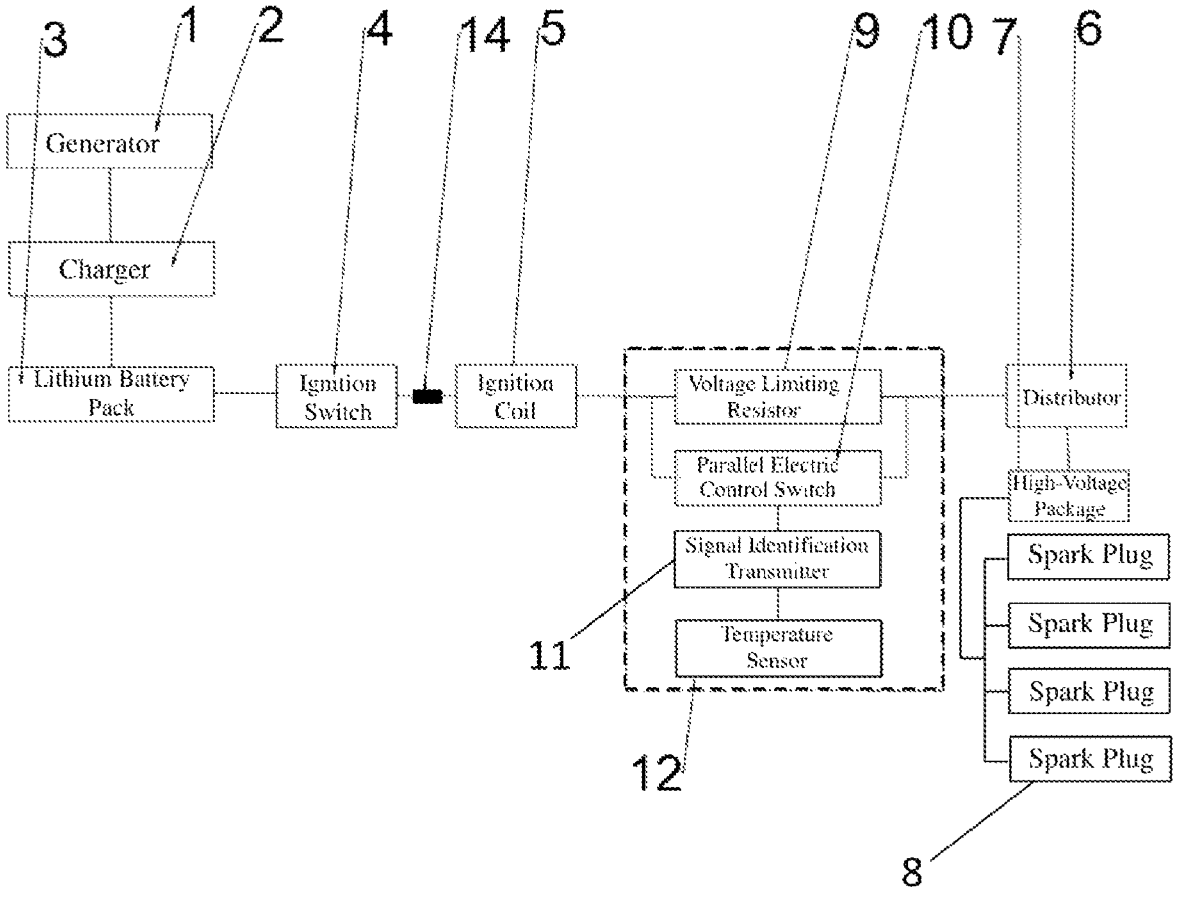
FIG. 1 is a schematic structural diagram of the high-voltage ignition device for automobiles that can avoid generating high temperatures according to Embodiment 1 of the invention.

As shown in the FIGS.: 1 refers to the generator; 2 refers to the charger; 3 refers to the lithium battery pack; 4 refers to the ignition switch; 5 refers to the ignition coil; 6 refers to the distributor; 7 refers to the high-voltage package; 8 refers to the spark plug; 9 refers to the voltage limiting resistor; 10 refers to the parallel electric control switch; 11 refers to the signal identification transmitter; 12 refers to the temperature sensor; 13 refers to the parallel manual control switch; 14 refers to the fuse.

5. SPECIFIC EMBODIMENT OF THE INVENTION

In order to make the objectives, technical solutions, and advantages of the embodiments of the invention clearer, the technical solutions in the embodiments of the invention will be described clearly and completely hereinafter with reference to the drawings in the embodiments of the invention. Obviously, the described embodiments are part of the embodiments of the invention, rather than all of the embodiments. The components of the embodiments of the invention generally described and illustrated in the drawings herein may be arranged and designed in various different configurations.

Embodiment 1

With reference to FIG. 1, a high-voltage ignition device for automobiles that can avoid generating high temperatures, comprising a generator 1, a charger 2 electrically connected to the generator 1, a lithium battery pack 3 electrically connected to the charger 2, an ignition switch 4 electrically connected to the lithium battery pack 3, an ignition coil 5 electrically connected to the ignition switch 4, a distributor 6 electrically connected to the ignition coil 5, a high-voltage package 7 electrically connected to the distributor 6, and spark plugs 8 electrically connected to the high-voltage package 7; the spark plugs 8 are provided with multiple;

the voltage of the lithium battery pack 3 is higher than the voltage of the generator 1, and a control switching device is provided between the ignition coil 5 and the distributor 6.

The control switching device comprises a voltage limiting resistor 9, a parallel electric control switch 10, and a signal identification transmitter 11; the signal identification transmitter 11 is electrically connected to a temperature sensor 12, and the signal identification transmitter 11 is electrically connected to the parallel electric control switch 10; the voltage limiting resistor 9 is connected in series between the ignition coil 5 and the distributor 6; the distributor 6 is electrically connected to the high-voltage package 7, and the high-voltage package 7 is electrically connected to the spark plugs 8; the parallel electric control switch 10 is connected in parallel with the voltage limiting resistor 9.

The lithium battery pack 3 is provided in a battery box; a buffer pad is filled between the lithium battery pack 3 and the inner wall of the battery box, and the outside of the lithium battery pack 3 is wrapped with a PE film;

a fuse 14 is provided on the circuit between the ignition switch 4 and the ignition coil 5.

When the invention is in specific implementation, the lithium battery pack 3 can adopt four 3.7V lithium batteries, which have the ability to charge to 14.6V, and the charging voltage of the generator 1 is 14.1-14.2V; when installing, discharge the lithium battery pack 3 first to ensure that the potential of the generator 1 is higher than the potential of the lithium battery pack 3 to ensure that charging can be completed. Since the voltage of the lithium battery pack 3 is slightly higher than the output voltage of the generator 1, the lithium battery pack 3 can be charged to 13.9-14V during use, and this design can delay battery aging and decay, thereby achieving long-term constant high-voltage ignition. Ignition process: the ignition switch 4 is connected to the sensor through the ECU, and the sensor senses the ignition command and transmits the signal to the ignition switch 4 through the ECU, which controls the ignition of the ignition switch 4; the contacts of the distributor 6 are closed, and the primary winding is energized; the current flows from the positive electrode of the lithium battery pack 3 through the ignition switch 4, the primary winding of the ignition coil 5, the contacts of the distributor 6, and the ground back to the negative electrode of the lithium battery pack 3; when the contacts of the distributor 6 are open and the primary winding is energized, a magnetic field is generated around it and is strengthened by the action of the iron rod; when the cam in the distributor 6 opens the contacts, the circuit is cut off and the circuit quickly drops to zero; the magnetic flux in the iron rod then rapidly attenuates or even disappears, thus inducing a very high voltage, causing the gap between the two electrodes of the spark plug 8 to be broken down, generating sparks to complete ignition.

The temperature sensor 12 is installed on the water tank to sense the water temperature and transmit the information to the signal identification transmitter 11. When the water temperature is higher than 90° C., the signal identification transmitter 11 sends a closing signal to open the parallel electric control switch 10, and the parallel electric control switch 10 adopts the delayed closing form, and the delay is set to 5 minutes. During these 5 minutes, the current can only flow through the voltage limiting resistor 9 to achieve control, thereby reducing the ignition voltage to 13.4-13.5V The water temperature can be prevented to be too high by reducing the voltage to ensure normal operation, and the water temperature will return to normal after 5 minutes. The signal identification transmitter 11 sends an opening signal to close the parallel electric control switch 10 and short-circuit the voltage limiting resistor 9. The current flows through the parallel electric control switch 10. The water in the water tank can be used to cool down in time during high-voltage ignition.

Embodiment 2

Figure 2:
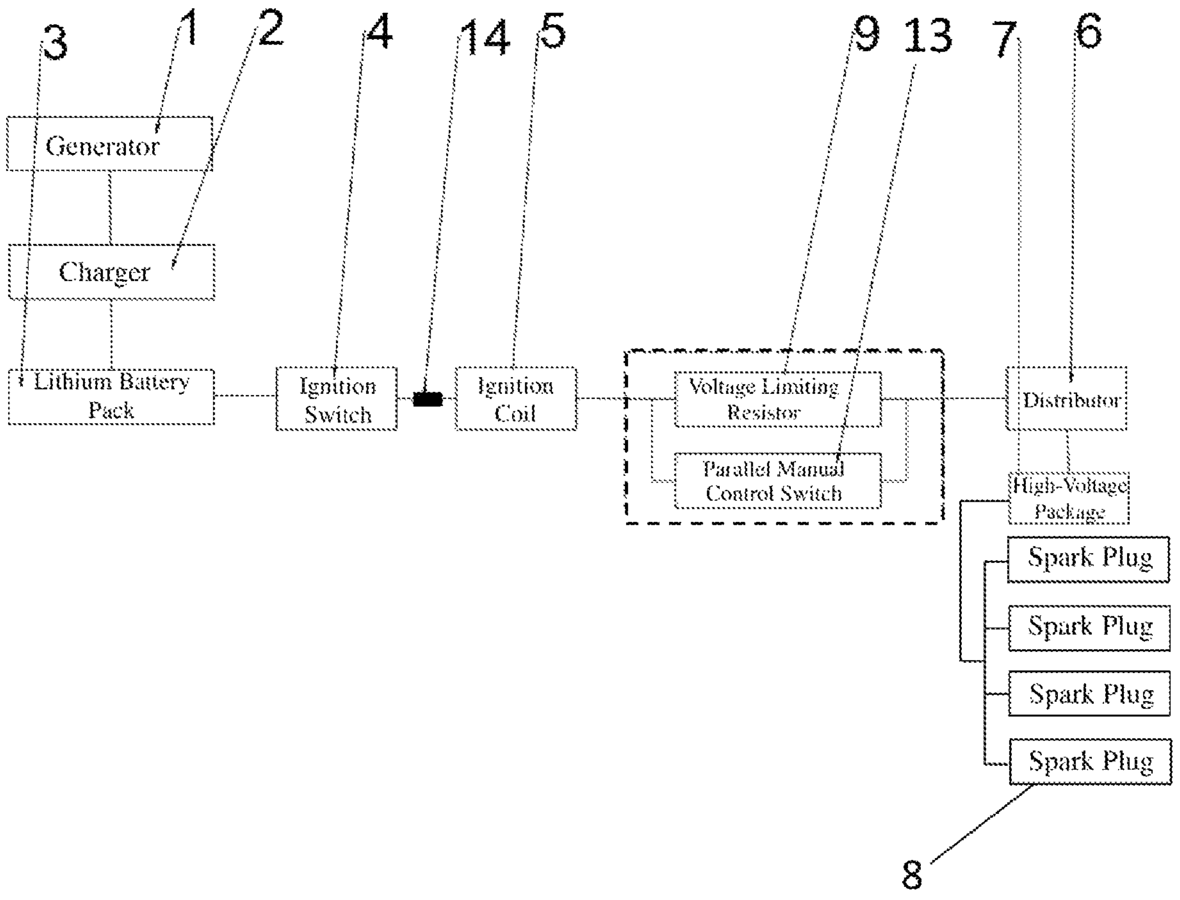
FIG. 2 is a schematic structural diagram of the high-voltage ignition device for automobiles that can avoid generating high temperatures according to Embodiment 2 of the invention.

With reference to FIG. 2, a high-voltage ignition device for automobiles that can avoid generating high temperatures, comprising a generator 1, a charger 2 electrically connected to the generator 1, a lithium battery pack 3 electrically connected to the charger 2, an ignition switch 4 electrically connected to the lithium battery pack 3, an ignition coil 5 electrically connected to the ignition switch 4, a distributor 6 electrically connected to the ignition coil 5, a high-voltage package 7 electrically connected to the distributor 6, and spark plugs 8 electrically connected to the high-voltage package 7; the spark plugs 8 are provided with multiple;

the voltage of the lithium battery pack 3 is higher than the voltage of the generator 1, and a control switching device is provided between the ignition coil 5 and the distributor 6.

The control switching device comprises a voltage limiting resistor 9 and a parallel manual control switch 13; the voltage limiting resistor 9 is connected in series between the ignition coil 5 and the distributor 6; the distributor 6 is electrically connected to the high-voltage package 7, and the high-voltage package 7 is electrically connected to the spark plugs 8; the parallel manual control switch 13 is connected in parallel with the voltage limiting resistor 9.

The lithium battery pack 3 is provided in a battery box; a buffer pad is filled between the lithium battery pack 3 and the inner wall of the battery box, and the outside of the lithium battery pack 3 is wrapped with a PE film;

a fuse 14 is provided on the circuit between the ignition switch 4 and the ignition coil 5.

Compared with Embodiment 1, the control switching device changes from automatic to manual, and the remaining working processes and principles remain unchanged. During specific implementation, the parallel manual control switch 13 can be set on the vehicle console to facilitate control.

In the description of the invention, it needs to be understood that the orientation or positional relationship indicated by the terms "center", "up", "down", "left", "right", "vertical", "horizontal", "inner", "outer", etc. are based on the orientation or positional relationship shown in the drawings, which are only for the convenience of describing the invention and simplifying the description, rather than indicating or implying that the device or element referred to must have a specific orientation, be constructed and operated in a specific orientation, and therefore cannot be understood as a limitation of the invention. In addition, the terms "first", "second", and "third" are only used for descriptive purposes, and cannot be understood as indicating or implying relative importance or implicitly indicating the number of indicated technical features.

In addition, the terms "horizontal", "vertical", "dangling", etc. do not mean that the component is required to be absolutely horizontal or hanging, but may be slightly inclined. For example, "horizontal" only means that its direction is more horizontal than "vertical", it does not mean that the structure must be completely horizontal, but can be slightly inclined.

In the description of the invention, "plurality" means at least two.

In the invention, unless otherwise clearly defined and limited, the terms "provided", "installed", "connected" and other terms should be interpreted broadly; for example, it can be a fixed connection, it can be a detachable connection, or integrated; it can be a mechanical connection or an electrical connection; it can be a direct connection, or an indirectly connection through an intermediate medium, and it can be an internal communication between two elements or the interaction relationship between two elements. For those of ordinary skill in the art, the specific meaning of the above terms in the invention can be understood according to specific circumstances.

The invention and the embodiments thereof are described hereinabove, and this description is not restrictive. What is shown in the drawings is only one of the embodiments of the invention, and the actual structure is not limited thereto. All in all, structural methods and embodiments similar to the technical solution without deviating from the purpose of the invention made by those of ordinary skill in the art without creative design shall all fall within the protection scope of the invention.

The invention claimed is:

1. A high-voltage ignition device for automobiles that can avoid generating high temperatures, comprising a generator (1), a charger (2) electrically connected to the generator (1), a lithium battery pack (3) electrically connected to the charger (2), an ignition switch (4) electrically connected to the lithium battery pack (3), an ignition coil (5) electrically connected to the ignition switch (4), a distributor (6) electrically connected to the ignition coil (5), a high-voltage package (7) electrically connected to the distributor (6), and spark plugs (8) electrically connected to the high-voltage package (7); the spark plugs (8) are provided with multiple;

the voltage of the lithium battery pack (3) is higher than the voltage of the generator (1), and a control switching device is provided between the ignition coil (5) and the distributor (6).

2. The high-voltage ignition device for automobiles that can avoid generating high temperatures of claim 1, wherein the control switching device comprises a voltage limiting resistor (9), a parallel electric control switch (10), and a signal identification transmitter (11); the signal identification transmitter (11) is electrically connected to a temperature sensor (12), and the signal identification transmitter (11) is electrically connected to the parallel electric control switch (10); the voltage limiting resistor (9) is connected in series between the ignition coil (5) and the distributor (6); the distributor (6) is electrically connected to the high-voltage package (7), and the high-voltage package (7) is electrically connected to the spark plugs (8); the parallel electric control switch (10) is connected in parallel with the voltage limiting resistor (9).

3. The high-voltage ignition device for automobiles that can avoid generating high temperatures of claim 1, wherein the control switching device comprises a voltage limiting resistor (9) and a parallel manual control switch (13); the voltage limiting resistor (9) is connected in series between the ignition coil (5) and the distributor (6); the distributor (6) is electrically connected to the high-voltage package (7), and the high-voltage package (7) is electrically connected to the spark plugs (8); the parallel manual control switch (13) is connected in parallel with the voltage limiting resistor (9).

4. The high-voltage ignition device for automobiles that can avoid generating high temperatures of claim 1, wherein the lithium battery pack (3) is provided in a battery box; a buffer pad is filled between the lithium battery pack (3) and the inner wall of the battery box, and the outside of the lithium battery pack (3) is wrapped with a PE film;

a fuse (14) is provided on the circuit between the ignition switch (4) and the ignition coil (5).

* * * * *